US008812566B2

(12) United States Patent
Aizman et al.

(10) Patent No.: US 8,812,566 B2
(45) Date of Patent: Aug. 19, 2014

(54) SCALABLE STORAGE FOR VIRTUAL MACHINES

(75) Inventors: Alexander Aizman, Mountain View, CA (US); Caitlin Bestler, Sunnyvale, CA (US)

(73) Assignee: Nexenta Systems, Inc., Mountain View, CA (US)

( * ) Notice: Subject to any disclaimer, the term of this patent is extended or adjusted under 35 U.S.C. 154(b) by 338 days.

(21) Appl. No.: 13/107,684

(22) Filed: May 13, 2011

(65) Prior Publication Data
US 2012/0290630 A1 Nov. 15, 2012

(51) Int. Cl.
G06F 12/00 (2006.01)
G06F 17/30 (2006.01)

(52) U.S. Cl.
CPC ............................. *G06F 17/30233* (2013.01)
USPC ...................................................... 707/827

(58) Field of Classification Search
USPC ...................................................... 707/827
See application file for complete search history.

(56) References Cited

U.S. PATENT DOCUMENTS

| | | |
|---|---|---|
| 5,430,855 A | 7/1995 | Walsh |
| 5,696,934 A | 12/1997 | Jacobson et al. |
| 6,223,206 B1 | 4/2001 | Dan et al. |
| 6,311,251 B1 | 10/2001 | Merritt et al. |
| 6,487,636 B1 | 11/2002 | Dolphin et al. |
| 6,832,289 B2 | 12/2004 | Johnson |
| 7,054,927 B2 | 5/2006 | Ulrich et al. |
| 7,089,281 B1 | 8/2006 | Kazemi et al. |
| 7,149,846 B2 | 12/2006 | Hetrick |
| 7,340,490 B2 | 3/2008 | Teloh et al. |
| 7,464,222 B2 | 12/2008 | Matsunami et al. |
| 7,594,024 B2 | 9/2009 | Shah et al. |
| 7,774,391 B1 * | 8/2010 | Le et al. ........................ 707/822 |
| 7,805,469 B1 | 9/2010 | Nagaralu et al. |
| 2001/0018728 A1 | 8/2001 | Topham et al. |
| 2002/0065810 A1 | 5/2002 | Bradley |
| 2002/0138559 A1 | 9/2002 | Ulrich et al. |
| 2005/0015461 A1 | 1/2005 | Richard et al. |
| 2005/0216481 A1 | 9/2005 | Crowther et al. |
| 2007/0033430 A1 | 2/2007 | Itkis et al. |

(Continued)

OTHER PUBLICATIONS

Windsor W. Hsu, et al., "The Automatic Improvement of Locality in Storage Systems", ACM Transactions on Computer Systems, vol. 23, No. 4, Nov. 2005, pp. 424-473.

(Continued)

*Primary Examiner* — Rehana Perveen
*Assistant Examiner* — Raheem Hoffler
(74) *Attorney, Agent, or Firm* — Sawyer Law Group, P.C.

(57) ABSTRACT

A method and system is disclosed for providing storage services to Virtual Machines (VMs) and the Hypervisor Platforms that host them. NAS referrals are used to control selection of NAS proxy servers that are optimized for the support of VMs and the Hypervisor Platforms accessing directories that are exclusively used in conjunction of a single VM. Referrals are dynamically controlled in a manner specific to the target environment to provide an optimal combination of local and network storage in support of VMs. A method of using named attributes allows referrals to subsets of a directory. The overhead of using a NAS proxy is tailored to the smallest set of accesses required to gain beneficial result from the use of local storage, and using direct access to shared network storage when local storage is not allocated. Most of the new suggested techniques are transparent to the existing NAS clients; some techniques may require modification of the NAS client software.

24 Claims, 10 Drawing Sheets

(56) References Cited

U.S. PATENT DOCUMENTS

| | | | |
|---|---|---|---|
| 2007/0288494 | A1 | 12/2007 | Chrin et al. |
| 2008/0034076 | A1 | 2/2008 | Ishikawa et al. |
| 2009/0030957 | A1* | 1/2009 | Manjunath .................... 707/205 |
| 2009/0094320 | A1 | 4/2009 | Palthepu et al. |
| 2009/0210431 | A1 | 8/2009 | Marinkovic et al. |
| 2009/0248953 | A1 | 10/2009 | Satoyama et al. |
| 2009/0327603 | A1 | 12/2009 | McKean et al. |
| 2010/0070732 | A1 | 3/2010 | Strutt |
| 2010/0083247 | A1* | 4/2010 | Kanevsky et al. ................ 718/1 |
| 2010/0106683 | A1 | 4/2010 | Nomoto et al. |
| 2011/0047195 | A1* | 2/2011 | Le et al. ........................ 707/827 |
| 2011/0246716 | A1 | 10/2011 | Frame et al. |

OTHER PUBLICATIONS

John A. Garrison and A. L. Narasimha Reddy, 2009, "Umbrella File System: Storage Management across Heterogeneous Devices", ACM Trans. Stor., 5, 1, Article 3 (Mar. 2009), 24 pages.

Erik Riedel, 2003, "Storage Systems Not Just a Bunch of Disks Anymore", Queue (Jun. 2003), pp. 32-41.

"Network File System (NFS) Version 4 Minor Version 1 Protocol", http://www.ietf.org/rfc/rfc5661.txt.

"pNFS Problem Statement", http://tools.ietf.org/id/draft-gibson-pnfs-problem-statement-01.txt.

"SCSI Inquiry Command", http://en.wikipedia.org/wiki/SCSI-Inquiry_Command.

"What is Clustering?" http://www.areasys.com/20110405116/General/nx3200-series-nexentastor-ha-cluster-solutions.html.

"Hierarchical storage management", http://en.wikipedia.org/wiki/Hierarchical_storage_management.

"Information Lifecycle Management", http://en.wikipedia.org/wiki/Information_Lifecycle_Management.

"SCSI Standards Architechture (*)", http://www.t10.org/scsi-3.htm.

"SCSI Read Commands", http://en.wikipedia.org/wiki/SCSI_Read_Commands.

"SCSI Write Commands", http://en.wikipedia.org/wiki/SCSI_Write_Commands.

"Solid-state drive", http://en.wikipedia.org/wiki/Solid-state_drive.

* cited by examiner

200

400

800

SCALABLE STORAGE FOR VIRTUAL MACHINES

CROSS-REFERENCE TO RELATED APPLICATIONS

This application is related to co-pending U.S. patent application Ser. No. 12/874,978, entitled "LOCATION INDEPENDENT SCALABLE FILE AND BLOCK STORAGE," filed on Sep. 2, 2010, and co-pending U.S. patent application Ser. No. 12/875,073, entitled "HETEROGENEOUS REDUNDANT STORAGE ARRAY," filed on Sep. 2, 2010, all of which are incorporated herein by reference.

FIELD OF THE INVENTION

The present invention generally relates to storage systems supporting virtual infrastructures, and more specifically, to Network Attached Storage (NAS) systems providing network storage to hypervisors and Virtual Machines.

BACKGROUND OF THE INVENTION

There are conflicting demands for storage associated with a specific Virtual Machine (VM). Directly-attached storage (DAS) provides the highest performance. But providing all of the local storage associated for each VM assigned to a host machine may not be an effective solution. Generally, this local storage will be in addition to copies maintained in a network file system. Relying on local storage alone is typically not an option due to its limited capacity, the need to support high availability, archiving and disaster recovery, the benefits of using centralized storage management and powerful NAS management tools. Files already stored in a network file system are already available over the network to support executing VMs, although with longer latencies and lesser throughput. Therefore it is very desirable to only use local storage for the subset of the VM-associated storage that will truly benefit from the optimized local access speeds. Additionally, when the VM is subject to migration, particularly live migration, the cost of replicating local storage can become excessive.

Finding a workable solution to this tradeoff is critical to supporting VMs with a solution that can scale to the degree that the market demands.

One of the drivers for this increased need to scale deployments is the ability of Hypervisors and Virtualization to perform "live migration" of VMs from one host to another. These capabilities are featured in solutions from VMware, Xen, KVM and Microsoft Hyper-V. The motivations for live migration vary from the desire to provide a fully dynamic system where processors and bandwidth are allocated on demand to merely allowing easy re-balancing of loads as the processing and/or bandwidth requirements of servers changes over time.

Specifically, live migration enables copying the memory image of a VM from one host machine to a new one without requiring the VM to be shut down. A process of copying the memory image of the VM is initiated from the current host to the target host. This process continues while the VM still executes on the current host. Memory pages that are modified after they are copied are copied again. This process continues until the new image is sufficiently copied so that the new image is ready to begin executing, and a cutover of the L2 and L3 network identifiers is made and the new image continues the work that the original image had been conducting. Some hypervisors may do the cutover before the full image is copied and rely upon page faults at the new location to pull un-migrated pages on demand.

An L3 address is a layer three address, such as an Internet Protocol address or an InfiniBand GID. An L2 address is a layer two address, such as an Ethernet MAC address or an InfiniBand LID.

Live migration enables assigning resources to VMs on a dynamic basis. These resources include server Virtual CPUs, network, storage and RAM. Conventional solutions require trading off between using shared storage (i.e. using a network for NAS or SAN access) and the need to copy the image between unshared/direct storage in parallel with the migration of the VM itself.

The same techniques used to migrate the memory image of the VM can be employed to migrate the supporting storage as well. These techniques can enable the final cutover from the old host to the new host to be fast enough to support live migration, but the total time required to support a migration requires reserving resources at both the old and new locations is increased. Extended double booking of resources imposes a cost that limits the scaling of clusters.

One common solution is to use network storage (NAS or SAN) to store the virtual disk image on a networked server. The essential migration required is to transfer the access rights for the virtual disk image from the source host to the destination host. This solution is workable, but reduces the performance of disk access from DAS speeds to network (NAS or SAN) speeds.

In addition to live migration, hypervisors create snapshot images of VMs that can be used to restart the VM from the point where the snapshot was taken after a failure of the VM or host.

In the target environment, creating snapshot files using local storage and then automatically replicating those files to NAS storage would drastically shorten the time required to create a VM snapshot. The reduced round-trip times alone can substantially improve performance. Even greater improvements can be further achieved by using Solid State Drives (SSDs) for local storage.

There are several features of NAS protocols that are intended to support both a uniform name space implemented by multiple file servers and to enable migration of files and directories from one server to another. Primary examples of these protocols would be Microsoft's Distributed File System (DFS) and NFSv4 and NFSv4.1.

One of these capabilities is the ability of a NAS server to refer a directory to another NAS server. NFSv4 offers this capability as referrals. Microsoft's Distributed File System (DFS) offers it as redirections. With referrals/redirections a central server can refer clients to other servers at specific mount points. This provides centralized control over client mounts using the NAS protocol itself.

NAS protocols also support maintenance of additional read-only copies of a file system on multiple servers. Clients needing only to read files can choose to access the replicated copies rather than the master copy. While the method of replication is generally not standardized there are well-known methods of implementing file-based replication using only standard NAS capabilities, as well as additional implementation-dependent methods of replicating when the two file systems have knowledge of each other's internal data structures.

There are multiple reasons for supporting a federated collection of file servers in a single global name space. The basic ability to place subdirectories on different servers without incurring changes on the client side provides for scalability, ease of management, capability to support user mobility, and other benefits well known in the art.

NAS protocols supporting Federated file systems also allow clients to claim exclusive ownership of a file, or even a directory, and cache the updates locally. Claiming exclusive ownership of a file or directory grants a NAS client the ability to exclude access by other users from interfering with optimizing local caching.

One of ordinary skill in the art will recognize that a file system can qualify as a clustered or parallel file system and still meet this definition of a Federated File System (Federated FS), although they would typically be marketed with the former labels.

NAS proxy servers are well known conventional elements where a server accepts requests from clients configured to use it, but may resolve those requests by accessing other network file servers. The NAS proxy server generally optimizes performance to its clients by reducing the number of network interactions required over longer-haul connections and/or by caching some of the files, or portions thereof, locally.

FIG. 1 shows a conventional deployment 100 using NAS proxy server 104. In one deployment all access to the network files is through the NAS proxy server 104, and the NAS proxy server 104 may combine name spaces presented by multiple network file servers into a single global names space. With a Federated FS 108, the file servers 114, 116 already have a common global namespace and may be connected to the NAS clients 106 directly. Referral to a NAS proxy server 104 is done when a directory is sufficiently migrated to the NAS proxy server 104 that overall access will be optimized by using the alternate server.

In either case, the NAS proxy server 104 will be servicing a larger portion of the global namespace than is optimal. In the target environment, a method is sought to provide the benefits of a NAS proxy server 104 while avoiding the overhead of using a proxy layer when no local resources have been allocated for the specific files or directories.

The conventional use of a file system NAS proxy server 104 has further undesirable effects in the target environment. A migrated VM must be explicitly re-directed from the NAS proxy server 104 associated with the prior location to the NAS proxy server 104 associated with the new location. This will require the VM to at least temporarily access the old NAS proxy server 104 while already at the new location, or to temporarily cease use of any proxy at all. A more desirable solution would migrate the NAS proxy server service in a manner that was transparent to the VM.

One shortcoming of NAS proxy servers 104 is that they add an extra step to the process of resolving a client's request. A NAS proxy server 104 must provide optimized service for a large enough subset of the requests it handles to justify the extra step of using a NAS proxy server 104.

A preferable solution would allow one or more NAS clients 106 to access the network file system directly when the local NAS proxy server 104 would be providing no optimization for a given directory.

Another possible solution would be to create a VM that acts as the NAS proxy server 104 for a specific VM. This dedicated VM would be a shadow of the VM it serviced; they would always be migrated in tandem. The two VMs would be configured to connect on a private port group or VLAN on each host that hosted them.

This dedicated local NAS proxy VM would employ conventional NAS proxy server techniques to serve up the global name space to its VM, while exercising control over which portions of the files were actually stored locally.

Creating a shadow VM to provide service to an application VM is a well-known virtualization technique that has been deployed to provide scalable hardware emulation. The limitations of this solution include the overhead of creating an additional service VM for each application VM required, and the fact that as isolated VMs the Local NAS proxy servers will be unable to find optimizations across their VM clients. For example, multiple Linux VMs will typically share many of the same files on their install partition. Having each Local NAS VM deal with only a single client effectively blocks the potential for de-duplication savings.

Another shortcoming of conventional solutions is the lack of integration between Virtualization Management and NAS/SAN Management. For example, information on the total load on local storage is not factored into the load balancing decisions made by Virtualization Management. In current solutions, only the resources directly controlled by the Hypervisor are factored in choosing where to deploy VMs. Further, NAS/SAN Management receives no notification on VM migrations and must infer when the network topology has changed. A better solution for the targeted environment would provide integration of these Management Planes.

Current solutions for supporting storage for VMs do not scale well because they rely on either shared storage, with the overhead associated, or on directly-attached storage (DAS). To be effective, DAS storage may prove to be ineffective because of the costs of providing adequate local storage that is redundant with network storage and/or because of the time durations required for complete migrations.

Attempts to address these problems using NAS proxy servers alone impose the cost of working through the proxy layer at all times, even for directories and files that are not being optimized with local storage.

Conventional solutions provide no integration of management of NAS referrals with the state of VMs or the serial pairing of VMs with a single Hypervisor Platform. The Federated FS is managed as though any Hypervisor Platform was as likely to access any Virtual Disk image in the pool as any other hypervisor, or in fact any other Client. NAS Management has only actual usage of files to guide it when selecting the optimum location for specific files. Virtualization makes this problem even more challenging for NAS Management by maintaining constant L3 and L2 addresses for migrating VMs.

There is also no optimization for the exclusive access patterns for directories associated with VMs. NAS Management has only actual usage of files to guide it when selecting the optimum location for specific files.

The present invention provides a method and a system to address all these issues.

SUMMARY OF THE INVENTION

A method and system is disclosed for providing storage services to Virtual Machines (VMs) and the Hypervisor Platforms that host them. NAS referrals are used to control selection of NAS proxy servers that are optimized for the support of VMs and the Hypervisor Platforms accessing directories that are exclusively used in conjunction of a single VM. Referrals are dynamically controlled in a manner specific to the target environment to provide an optimal combination of local and network storage in support of VMs. A method of using named attributes to allow referrals to subsets of a directory is also disclosed. The overhead of using a NAS proxy is tailored to the set of accesses that gain beneficial results from the use of local storage, and using direct access to shared network storage when local storage is not allocated. Most of the new suggested techniques are transparent to the NAS clients; some techniques may require modification of the NAS client software.

DETAILED DESCRIPTION OF THE INVENTION

The present invention generally relates to systems supporting virtual infrastructures, and more specifically, to Network Attached Storage (NAS) systems providing network storage to hypervisors and VMs. The following description is presented to enable one of ordinary skill in the art to make and use the invention and is provided in the context of a patent application and its requirements. Various modifications to the preferred embodiments and the generic principles and features described herein will be readily apparent to those skilled in the art. The phrase "in one embodiment" in this specification does not necessarily refers to the same embodiment. Thus, the present invention is not intended to be limited to the embodiments shown, but is to be accorded the widest scope consistent with the principles and features described herein.

A method and system is disclosed for providing storage services to Virtual Machines (VMs) and the Hypervisor Platforms that host them. NAS referrals are used to control selection of NAS proxy servers that are optimized for the support of VMs and the Hypervisor Platforms accessing directories that are exclusively used in conjunction with a single VM. Referrals are dynamically controlled in a manner specific to the target environment to provide an optimal combination of local and network storage in support of VMs.

The present invention provides a method and a system for effective dynamic utilization of local storage, using a fraction of the resources that would otherwise be required to store the entirety of the storage associated with each VM assigned to a given host.

A system and method in accordance with the present invention introduces a specialized class of NAS proxy, which it labels as a "VM Storage Proxy", specifically tailored to optimized large virtual deployments. This specialized server is never intended to become the new home of the files within the namespace; it can be used as a reliable cache that optimizes access for the intended clients. In the target environment it would be desirable to drop local storage for files or portions of files that have been replicated to the network file system at will, in order to optimize the utilization of limited local storage resources. This enables deployment profiles where the VM Storage Proxy may only have limited, but high performance, storage resources such as Solid State Disks (SSDs).

A system and method in accordance with the present invention introduces a management plane role, NAS Virtualization Management System (NAS VMS), which controls the specified services.

Figure 1:
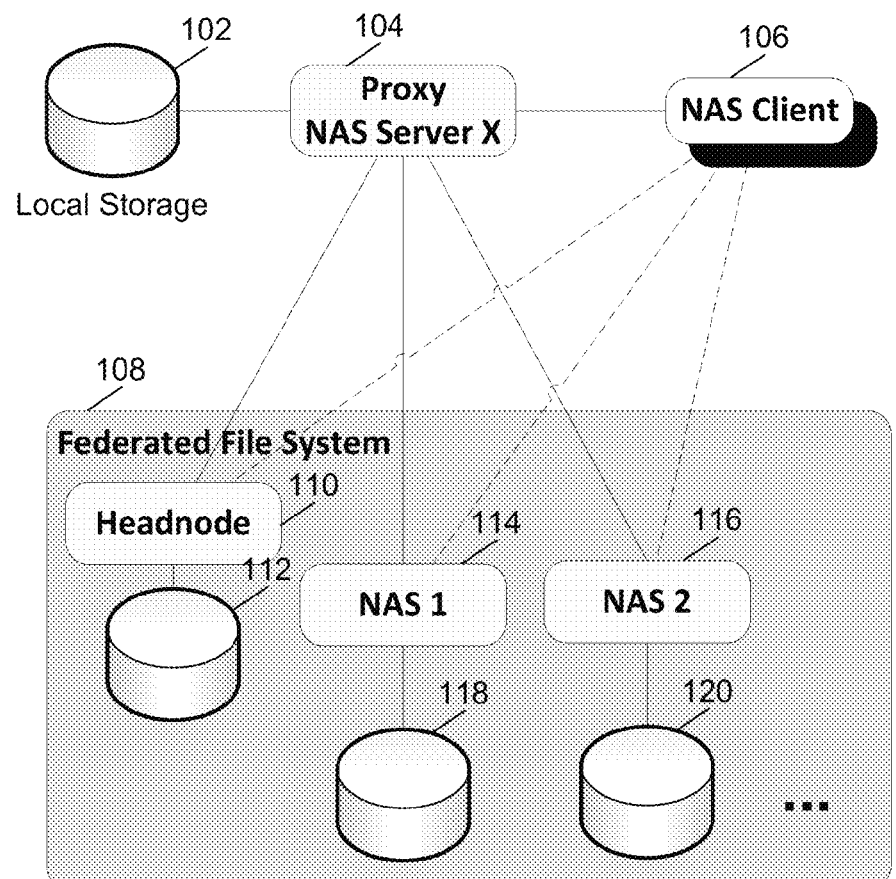
FIG. 1 illustrates a conventional deployment using NAS proxy servers.
Figure 2:
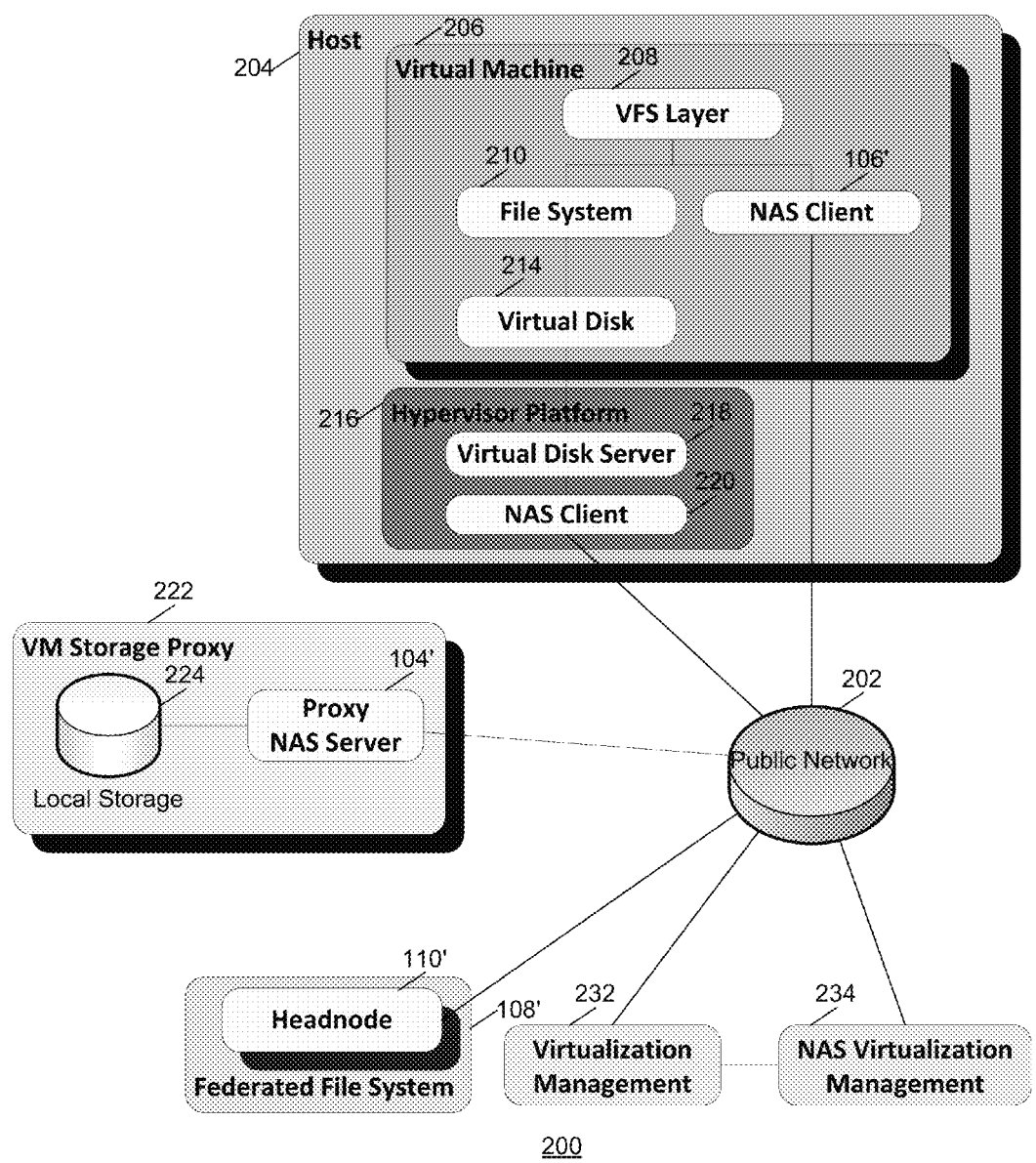
FIG. 2 illustrates the components of a first embodiment where VM Storage Proxies are accessed on the public network.

The following sections describe specific aspects of a system in accordance with the present invention. FIG. 2 illustrates the components of a first embodiment of a system 200 where at least one VM Storage Proxy 222 is accessed on the public network 202. The system 200 includes the following elements:

a. A VM Storage Proxy 222
b. A Hypervisor Platform 216
c. Virtualization Management 232
d. One or more Virtual Machines (VMs) 206
e. A Federated File System (Federated FS) 108'
f. The NAS Virtualization Management System (NAS VMS) 234.

The required control over NAS referrals and local storage caching may be exercised by the VM Storage Proxy 222 itself and/or the NAS VMS 234.

The NAS VMS 234 selects one or more VM Storage Proxy 222 to exercise control over VM private directories or a subset of those directories. Each of these elements will be described with more particularity herein below in conjunction with the accompanying Figures.

VM Storage Proxy

The VM Storage Proxy 222 is a specialized subset of a conventional NAS Proxy. One of ordinary skill in the art will recognize that there are many solutions as to how a NAS Proxy organizes its processing of network requests and maintaining its internal data. The VM Storage Proxy 222 differs as specified in this description.

The VM Storage Proxy 222 acts as a specialized Proxy Server for eligible clients for all directories within VM private directories that the VM Storage Proxy 222 has had selectively referred to it. The VM Storage Proxy 222 does not seek the referral of any directory before it is ready to act as the Proxy Server for that Directory. The VM Storage Proxy 222 does not provide service for any VM client before it has exclusively claimed that VM's root private directory.

Write requests for cached files will be fulfilled using local storage. The updates will be queued for asynchronous forwarding to the Federated FS 108' with the VM Storage Proxy 222 acting as a NAS client. Write operations on uncached files can simply be forwarded directly to the correct file server.

Each VM Storage Proxy 222 provides a NAS proxy service to one or more VMs 206 and the Hypervisor Platforms 216 that support them. Each VM Storage Proxy 222 also acts as a NAS Client 220 with Headnodes 110' in the Federated FS 108'.

In the embodiment shown in FIG. 2, VMs 206 are dynamically assigned to VM Storage Proxies 222 by the NAS VMS 234 and access is over the public network 202.

Figure 3:
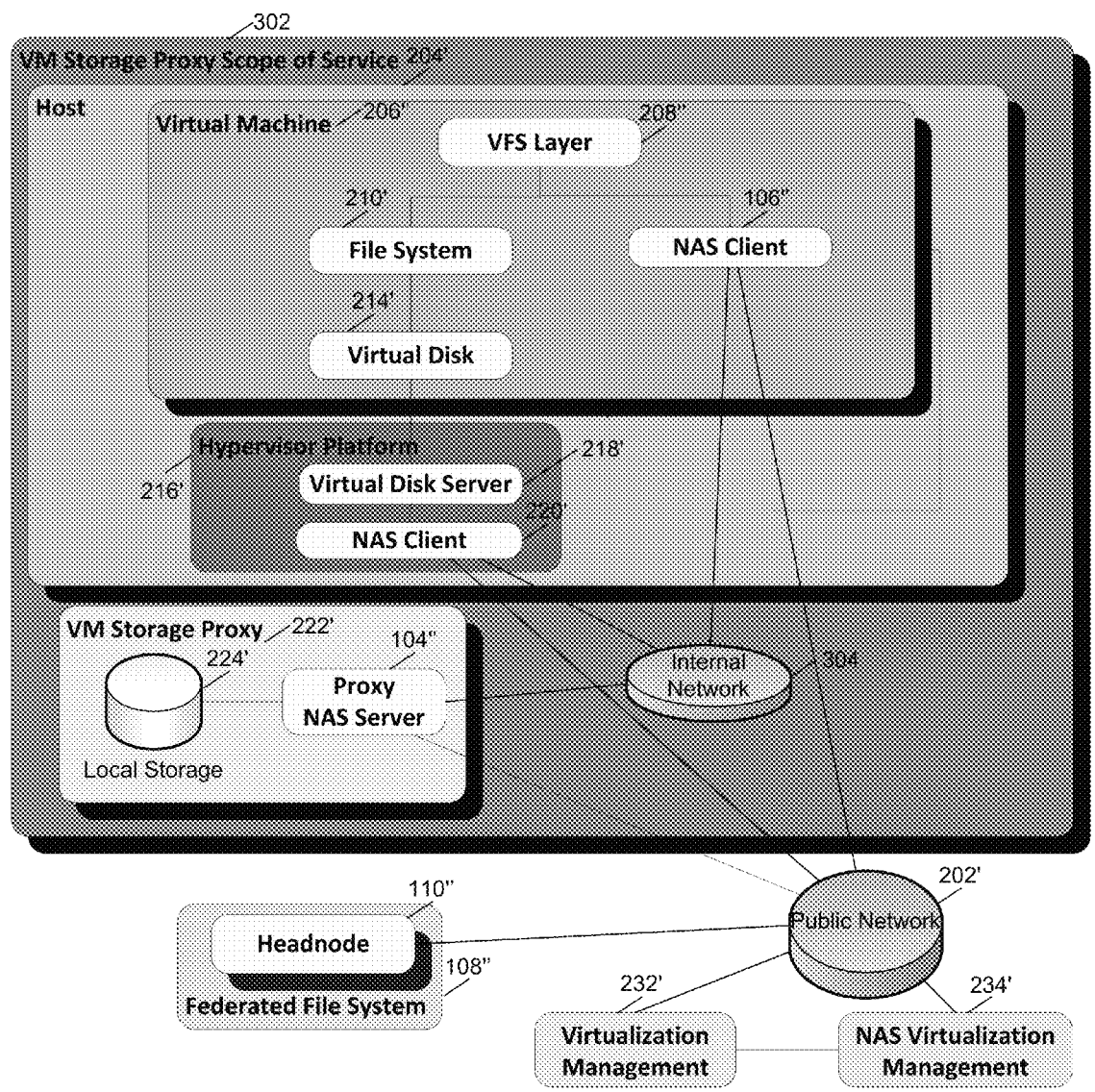
FIG. 3 illustrates an alternate embodiment where a VM Storage Proxy is available to a set of Hypervisor Platforms within a scope serviced by an Internal Network.

The embodiment 300 shown in FIG. 3 is a slight variation where the VM Storage Proxies 222' are accessed over an Internal Network 304.

Referring back to FIG. 2, the VM Storage Proxy 222 may control the location of directories within VM specific private directories of the VMs 206 assigned to it. The VM Storage Proxy 222 may cause the Federated FS 108" to specify itself as the referred file server for any directory within a VM specific directory, thereby overriding the normal location configured for the Federated FS 108'.

When connected to an Internal Network 304 as shown in FIG. 3 the VM Storage Proxy 222 goes further than not providing service to clients before claiming control of a VM's private directory. Any packet received from a VM 206 via an Internal Network 304 prior to claiming control of the VM Private Directory must be silently ignored.

Referring back to FIG. 2, alternatively, the NAS VMS 234 will determine which files and directories should be serviced by which VM Storage Proxy 222. The VM Storage Proxy 222 will provide proxy service for those directories and files assigned to it. The VM Storage Proxy 222 will provide access statistics for each VM 206 to support a strategy of centrally controlling load balancing.

Whether the distribution of directories is managed centrally and/or an a distributed basis, the VM Storage Proxy 222 differs from a classic proxy file server in that the proxy service is restricted to directories that are VM 206 specific and only the identified clients are supported. Specifically the only clients are the VM 206 itself, the Hypervisor Platform 218, VM Storage Proxy 222 assigned to support the VM 206 and/or privileged read-only Management Plane clients.

In certain embodiments, the VM Storage Proxy 222 will include a block server that provides block services to a proxy server and optionally to pNFS capable NAS clients. Block services are implemented by accessing Local Storage 224 controlled by the VM Storage Proxy 222 or by directly accessing the blocks on the Federated FS 108'.

Those skilled in the art will recognize that the workloads that given deployments of VM Storage Proxies 222 are designed to handle will vary greatly by site and over time. For example one embodiment may have very high performance but very scarce local storage resources, such as Solid State Drives (SSDs). Such an embodiment would have a high priority on minimizing local storage to those directories, files and blocks that will achieve the greatest performance gains. A different embodiment might provision a VM Storage Proxy 222 to support multiple Hypervisor Platforms 216 with a full RAID array of local storage with a large capacity and only relies on the Federated FS 108' for disaster recovery and archiving.

Host and Hypervisor Platform

The Hypervisor Platform 216 is the OS controlling a given host platform which launches VMs 206 as directed by Virtualization Management 232 and provides/coordinates virtual IO services. This includes platform resident domains, such as Device Domains used in for example Xen, which support the Hypervisor in providing services to the guest VMs 206. Each Hypervisor Host contains a single Hypervisor Platform 218 and zero or more VMs 206.

A system and method in accordance with the present invention supports the Hypervisor Platforms 216 as clients without requiring any enhanced functionality. While not required, it is desirable for any NAS Client 106' or 220 to understand a partial directory referral technique.

Virtual Machine/Guest

Typically each Hypervisor Platform 216 supports multiple VMs 206. The VM 206 uses networked storage either indirectly through what it perceives as Direct Attached Storage, or through NAS mount points. The VM 206 does not necessarily need to participate in the NAS delegation exchanges itself, and may in fact be unaware of migration of the directories it mounts. An embodiment of the present invention utilizes only standard capabilities of the VMs 206 and their installed operating systems. While not required, it is desirable for any NAS Client 106' to understand partial directory referral technique.

Federated File System (Federated FS)

A Federated File System (Federated FS) 108' has been previously defined. In the present specification, the term "Virtual Machine private directory" refers to a directory or set of directories within a Federated FS 108' that are specific to that VM 206. The term "Headnode" 110' refers to the specific server within the Federated FS 108' that is the default location for the directories that are specific to the VM 206.

In an embodiment, a Headnode 110' will support a mechanism for automatically overriding the normal home of any VM private directory based upon a VM Storage Proxy 222 claiming that directory using NFS exclusive delegation or a CIFS exclusive oplock (opportunistic lock). For the duration of the claim, a Headnode 110" supporting this feature will refer/redirect any clients associated with the VM Storage Proxy 222 to that VM Storage Proxy 222, and refuse access by any other client.

In an embodiment, each Headnode 110' will also track the level of direct activity from the NAS Clients 106' for any directory returned to it by the VM Storage Proxy 222. Based upon the level of activity, a Headnode 110' may notify the VM Storage Proxy 222 of how much traffic it has handled for each NAS Client 106' for the directory in question so that the VM Storage Proxy 222 may consider reclaiming the directory.

The network used to access the Federated FS 108' is referred to as "the public network" 202 in this application. This is to distinguish this network from local internal networks 304 (refer to FIG. 3) which may connect clients with VM Storage Proxies 222 within a specific local scope such as one Hypervisor Host or one equipment rack. This "public network" 202 may itself be a corporate network that is "private" relative to a public network such as the Internet as a whole.

Virtualization Management

Virtualization Management 232 refers to a Management Plane infrastructure to control the dispatch of VM images to Hypervisor Platforms 218, provisioning of their supporting virtual devices and supporting network services. It is typically software running on one or more servers.

A system and method in accordance with the present invention, relies on existing capabilities of Virtualization Management 232 systems; one embodiment employs existing mechanisms to trigger notification of NAS Virtualization Management 234 whenever a VM 206 is dispatched, migrated, suspended, or terminated.

In an embodiment, when choosing where to deploy VMs 206, Virtualization Management 232 employs load-balancing algorithms that utilize performance statistics gathered on a per-VM basis by the VM Storage Proxies 222.

NAS Virtualization Management System (NAS VMS)

NAS VMS 234 is a management plane infrastructure which executes on the same or different servers than the Virtualization Management 232. The NAS VMS 234 is responsible for configuring VM Storage Proxies 222 as the result of the assignment or de-assignment of VMs 206 to Hypervisor Platforms 216 and ongoing performance data collected by the VM Storage Proxies 222 and the Headnodes 110' of the Federated FS 108'.

FIG. 3 illustrates an alternate embodiment where a VM Storage Proxy 222' is available to one or more Hypervisor Platforms 216' within a scope serviced by an Internal Network 304. Elements that are common to FIG. 2 have the same reference designators. In an embodiment, the NAS VMS 234' is responsible for selecting which VM Storage Proxy 222' will provide service for each VM 206'. This decision can be based upon historical performance data gathered by the VM Storage Proxies 222' and/or Headnodes 110" for each VM 206'. The decision can be supplemented with knowledge about the class of VM and its Service Level Agreements as obtained from Virtualization Management 232'.

The scope of the Internal Network 304 may be a single Hypervisor Host. In this case, the VM Storage Proxy 222' runs as a VM 206' and the Internal Network 304 is simply a private VLAN implemented in the Hypervisor Platform's 218' Software Switch.

However, it may be desirable to deploy a VM Storage Proxy 224' to support multiple hosts particularly when the network bandwidth between those machines is less scarce than over the public network. One example would be blade servers in a single chassis. Multiple servers in a single rack may also qualify. In either case a VM Storage Proxy 222' can take advantage of the relatively high bandwidth for "local" traffic within the chassis/rack. The only requirement is that the Internal Network 304 be isolated from the Public Network 202' either physically or by network controls such as VLANs or Port Groups.

The VM Storage Proxy 222' interfaces with its clients as a NAS proxy server 104", preferably using the Internal Network 304. It also accesses the Federated FS 108" over the Public Network 202' as a NAS Client 106".

The VM Storage Proxy 222' relies upon the VMs 206' and Hypervisor Platforms 216' being configured to meet the following requirements:

VM Storage Proxy Internal L3 Address: a VM Storage Proxy 222' that interfaces the Internal Network 304 will have a constant L3 Addresses that will map to a constant L2 Address. Having a stable network identity for accessing referral/redirection is preferable than having to do a dynamic redirection whenever the VM 206' is migrated. It is also matches the intention of virtualization; the client VM 206' should not be aware of the fact that it has been migrated.

Because the Internal Network 304' is isolated, the same L3 and L2 addresses can be re-used for each VM Storage Proxy 222'. Maintaining a stable L3 identity simplifies the process of maintaining service when VMs migrate. Because the VM Storage Proxy's 222' identity is unchanged the VM 206' will merely think the server has rebooted, and will reconnect so as to maintain the NAS session.

Each VM Storage Proxy 222' configured to use the consistent L3 and L2 addresses must provide the same identifiers under the NAS protocols, which may include items beyond just the L3 and L2 address.

Client L3 Addresses: Virtualization Management 232' assigns each client VM 206' or Hypervisor Platform 218' one or more L3 Addresses and L2 Addresses. These addresses cannot be spoofed on an internal network 304, enabling the VM Storage Proxy 222' to identify the specific client that is making each request. Each VM 206' is only provided access to portions of its VM directory, and each Hypervisor Platform 216' is only provided access to the directories of VMs assigned to it.

Each client VM 206' will also be assigned L3 and L2 Addresses to enable access to the public network VM Storage Proxy Public L3 Address: Each VM Storage Proxy 222' also has unique L3 and L2 addresses that it uses to communicate over the public network with the file systems of the Federated FS 108". These addresses do not migrate as VMs 206' migrate. When network Virtual Functions are available for direct assignment the VM Storage Proxy 222' should be assigned one for access to the public network.

These configuration rules can be achieved by configuring forwarding within the hosts that a single VM Storage Proxy 222' supports and any switch/routers connecting them. When physical forwarding elements are involved (switches and/or routers) they may be physically separated from the public network, or merely isolated using Port Groups, VLANs or other tunneling protocol that create a virtual network. The required result is that the VM Storage Proxy's 222' local L3 address is only reachable from internal ports, and that traffic from any internal port to the designated L3 or L2 address will be forwarded to the VM Storage Proxy 222'.

Hypervisors already configure local switching so as to prevent VMs 206' from impersonating other VMs 206' and to control the set of ports that are allowed to communicate with each other. Further the L2 Address for each VM 206 is already used to re-configure the network during a migration. These existing mechanisms can guarantee that the VM Storage Proxy 222' has a local port with a fixed L3 and L2 addresses on all host platforms. Therefore, all traffic to the VM Storage Proxy 222' sent by the VM 206' will always be forwarded to the current host's VM Storage Proxy 222'.

Figure 4:
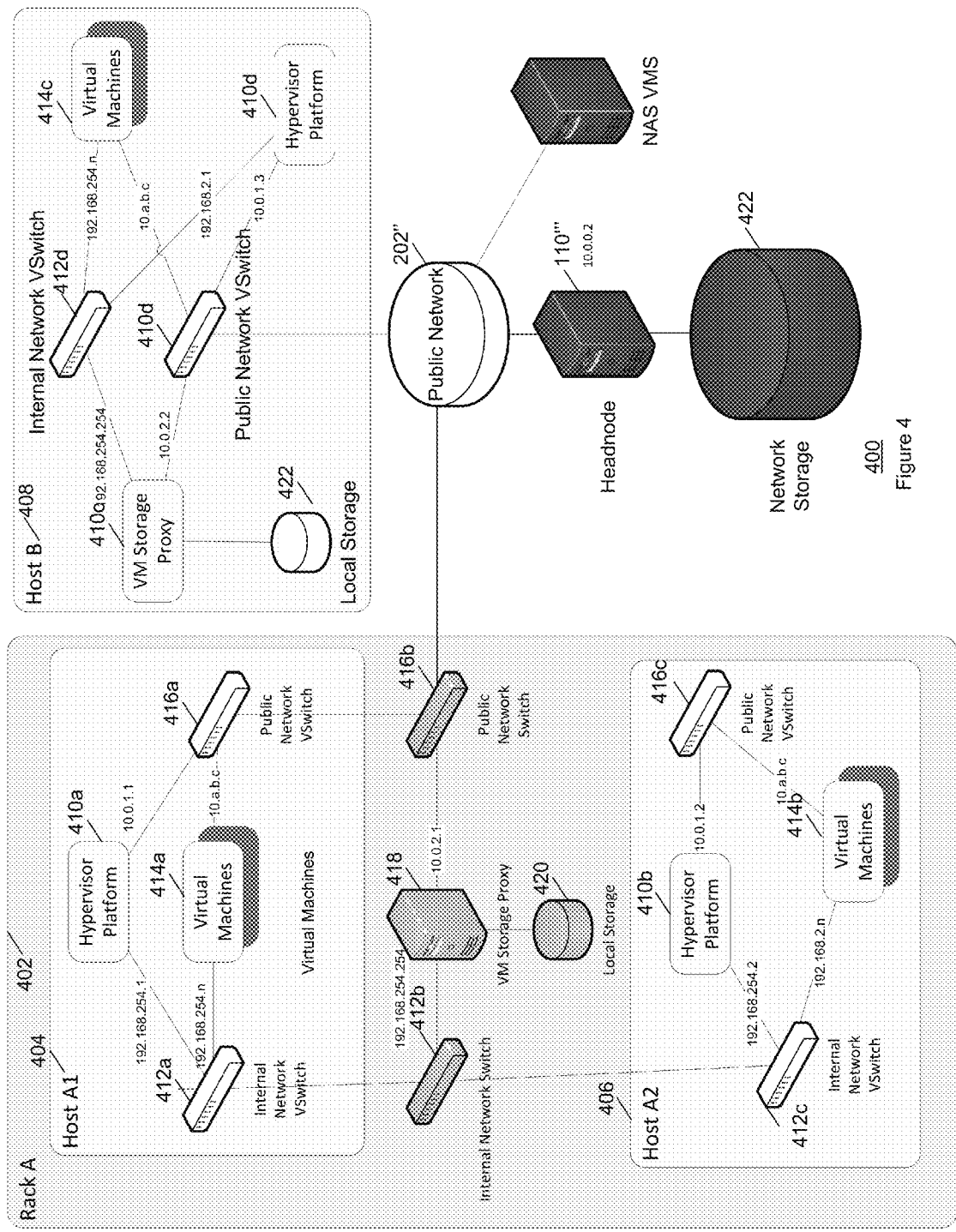
FIG. 4 illustrates an example network with two different methods of deploying VM Storage Proxies.

FIG. 4 illustrates an example network with two different methods of deploying VM Storage Proxies. Host A1 404 and Host A2 406 share an Internal Network. They may be in the same blade chassis or the same rack. Host B 408, by contrast, hosts VM Storage Proxy 410c as a VM. In both Internal Networks the same 192.168.*.* subnet is used. The VM Storage Proxy 410c IP address is 192.168.254.254. The Hypervisor Platforms 410a, 410b, and VMs 414a and 414b are assigned addresses within this network, In this example, the public network 202" uses the 10.*.*.* network. Each VM Storage Proxy 418 and 410c, Hypervisor Platform 410a and 410b, and VM 414a, 414b and 414c is assigned a unique IP address within this subnet.

Virtual Machine Private Directory

The Federated FS hosts a private directory, or set of directories, for each VM. These directories are intended for the exclusive use of that VM 414a-414c or the Hypervisor Platform 410a-410d the VM 414a-414c has been assigned to. Each VM private directory has a known path and is assigned to a specific network file server.

Each VM's Private Directory Set includes directories that serve different purposes:

a. One or more directories are for use by the Hypervisor Platform 410a, 410b, and 410d that the VM 414a-414c has been assigned to. These include virtual disk image files and VM snapshot files.

b. One or more directories may be used by VM Storage Proxies 418, 410c and optionally the Federated FS to record performance statistics for this VM 414a-414c, and to transfer the NAS Response Cache when migrating support for a VM 414a-414c from one VM Storage Proxy to another.

c. Zero or more directories that are to be exported exclusively to the VM as NAS mount points.

While the VM private directories are intended solely for support of a specific VM 414a-414c, The Federated FS may allow read-only access to these directories for management plane purposes. Examples of such uses include data mining and potentially read-write access for file maintenance while the VM 414a-414c is turned off (i.e., neither running nor suspended). Neither of these access patterns requires highly synchronized concurrent access with any proxy actions taken by the VM Storage Proxy 418, 410c. They are therefore compatible with the present invention and do not destroy the essential view that these directories are each exclusively for a single VM 414a-414c.

The system maintains the following state information for each VM Private Directory:

a. The identity of the VM Storage Proxy (418, 410c), if any, that has control over the corresponding VM Private Directory. This is represented in the NAS protocol by having the VM Storage Proxy take exclusive ownership of a specific token file within the VM Private Directory.

b. Whether the default location of each sub-directory within the VM Private Directory is as it was configured by the Federated FS Management Plane, or whether it has been overridden by the VM Storage Proxy (418, 410c) claiming exclusive ownership of this directory.

In an embodiment, these states are fully understood by the Headnodes 110''' as well as by the VM Storage Proxies 418, 410c and NAS Virtualization Management. However, a Headnode 110''' that understands the claims solely as exclusive claims on token files will meet the requirements of the VM Storage Proxies 418, 410c. This is because VM Storage Proxy only claim exclusive ownership of any directory within a VM Private Directory after it has first successfully claimed control of the VM Private Directory.

Assignment of control for the VM private directories is described below in the section entitled "Controlling Referrals".

Both NAS VMS and the VM Storage Proxies 418, 410c utilize per-VM performance history gathered by the VM Storage Proxies and Headnodes 110'''. The performance history is maintained across migrations.

When a VM Private Directory Set has been assigned to a VM Storage Proxy (418, 410c) by the NAS VMS, the following special access rules are enforced by the Federated FS:

Any token files within each directory used to exclusively claim control of a directory within the VM Private Directory Set may only be accessed by the corresponding VM Storage Proxy (418, 410c).

All files within the VM Private Directory Set may be accessed by the corresponding VM Storage Proxy. The specific replication protocol is outside the scope of the present invention, but includes at least the replication method of having the VM Storage Proxy (418, 410c) perform all operations as a NAS Client itself combined with explicitly setting the ownership of each file created or altered.

Pre-designated administrative users may be granted read-only access to any file within the VM Private Directory Set to support operations such as data-mining. This access must be granted in a fashion such that write access from the VM Storage Proxy (418, 410c) is in no way impaired by this concurrent read-only access. For example, users of this special administrative access might not be guaranteed that their reads of a file will reflect the most recent updates by the VM Storage Proxy.

When a directory has been claimed by a VM Storage Proxy (418, 410c), access by authorized NAS Clients will be referred/redirected to the VM Storage Proxy, unless direct access has been enabled for the file as noted below.

When a NAS Client and a VM Storage Proxy (418, 410c) share access to the same Internal Network, then the referral will use the fixed L3 address for all VM Storage Proxies on Internal Networks.

The VM Storage Proxy (418, 410c) may enable direct access by NAS Clients to directories within a VM Private Directory Set or to sets of files within a directory (when the Federated FS supports Partial Referral with named attributes).

The only eligible NAS Clients are the VMs 414a-414c, themselves and the Hypervisor Platforms 410a-410d that the VMs 414a-414c have been assigned to. VMs 414a-414c may access the directories designed to be private mount points.

Hypervisor Platforms 410a-410d may access the directories designated for Hypervisor Platform 410a-410d support such as those holding virtual disk images and VM snapshots. A directory is enabled for direct access when the VM Storage Proxy has not claimed the directory.

Files within a VM Private Directory may be enabled for direct access by creation of a named attribute for the directory that specifies those files and specifies the "revert to Federated FS" option for the referral target. Partial Referrals are described in the section entitled "Partial Directory Referral." The VM Storage Proxy may enable an alternate VM Storage Proxy to directly access files within a claimed directory by creating a named attribute that explicitly refers that set of files to the alternate.

The alternate VM Storage Proxy may not perform any operation that creates a name within the directory which has not been assigned to it.

Access by other clients not enumerated above is not supported.

In one embodiment, these access rules are implemented by enhanced Federated FS servers. The NAS VMS only provides the Federated FS with the L3 addresses of the various clients and VM Storage Proxies. Each enhanced Federated FS server can apply these rules given only the list of players. In an alternative embodiment, the NAS VMS uses existing configuration tools, such as Access Control Lists (ACLs), to configure Federated FS servers that have no intrinsic understanding of the rules or the rationale behind them.

The Federated FS and the VM Storage Proxy 418 may collaborate to provide referrals for parts of directories.

Each VM Storage Proxy (418, 410c) controls what portions of locally cached files actually use the local storage.

A system and method in accordance with the present invention supports two methods for migrating NAS support for the VM private directory when a VM 414a-414c migrates. They are:

a. A method where the NAS clients do not need to be informed of the migration. This is described in the section entitled "Transparent Migration of a VM".

b. A method where the identity of the referred NAS proxy server must be explicitly changed. This is described in the section entitled "Non-Transparent Migration".

Each VM Storage Proxy (418, 410c) employs a variety of well-known techniques to optimize the utilization of local storage across all of the files it supports. Specific techniques are discussed in the section entitled "Managing Local Storage".

A system and method in accordance with an embodiment imposes requirements on network configuration that can all be implemented using existing procedures. These requirements are described in the section entitled "Configuration of Host Environments". Each of the above elements will be described with more particularity herein below in conjunction with the accompanying Figures.

Controlling Referrals

A system and method in accordance with the present invention calls for a management plane embodiment of a management plane solution that is responsible for controlling the assignment of directories within VM private directories to specific VM Storage Proxies.

NAS VMS controls the assignment of the directories within a VM Private Directory to VM Storage Proxies based upon the following:
a. Notification of a VM migration, dispatch or suspension from the Virtualization Management system.
b. Other profile information about the specific VM as maintained by the Virtualization Management system. This may include the template used to instantiate the VM and the VM's Service Level Agreements (SLAs).
c. Other network topology information obtained from Virtualization Management or other sources.
d. Performance tracking data maintained by the Headnode' and/or VM Storage Proxies for each VM within pre-designated directories that are part of the VM Private Directory.
e. Other file system performance data that may be available independently of this invention.
f. Management Plane requests from VM Storage Proxies to end referral of specific directories or partial directories.

In addition to the management plane control described above, the present invention provides a control plane method to allow the VM Storage Proxies to control the subset of a VM Private Directory that will be referred to them.

There are numerous algorithms which may combine these factors which any embodiment may choose to implement. The end result is that each VM is assigned for proxy service by at most one VM Storage Proxy, and a subset of the directories associated with that VM may be referred to that VM Storage Proxy.

A network file server within the Federated FS may support a control plane extension to normal NAS protocols that allow configuring of Referral/Redirections to occur automatically when a VM Storage Proxy uses the NAS protocols to exclusively claim a directory within a VM private directory using a NAS protocol method of exclusively claiming a directory or a token file within the directory. For NFSv4 this is exclusive delegation. For CIFS it is exclusive oplocks.

A network file server with this capability will have been informed by the NAS VMS of the following:
a. The public L3 Addresses of each VM Storage Proxy allowed to use this control plane mechanism.
b. The public L3 Addresses of each Hypervisor Platform.
c. The scope of any Internal Network associated with a VM Storage Proxy, and the Internal L3 address of each Hypervisor Platform attached to that network.
d. The public L3 Addresses of each VM.
e. The Hypervisor Platform that each Virtual Machine is assigned to.

The network file server will recognize a claim of a directory when it grants a request by the claiming VM Storage Proxy to either:
a. Exclusively delegate an eligible directory to the VM Storage Proxy; or
b. Exclusive delegation/oplock a pre-designated token file within the directory.

The NAS VMS must also inform each VM Storage Proxy as to whether the Headnode' for a given VM supports this control plane method of reconfiguring referrals/redirections.

Partial Directory Referral

Partial Directory Referral is a feature requiring collaboration between VM Storage Proxies and the Federated FS. The NAS VMS informs the VM Storage Proxy whether the Headnode for a VM supports this feature when it assigns a VM to a VM Storage Proxy.

The feature allows publishing additional referrals that apply to specific subsets of a directory rather than to the directory as a whole. These additional referrals are conceptually optional because the primary file system referred will proxy accesses for the entire directory. But for clients supporting this feature the set of files assigned to each slice can be dynamically adjusted to finely rune the set of files that are routed through the VM Storage Proxy. Changes to the set of files being handled by the VM Storage Proxy is subject to the same restrictions on changing the referral for a directory as a whole. The extra information is published as named attribute metadata for the directory. A NAS Client that understands this convention will be able to contact the referred server for the specific subset.

Partial directory referrals are announced to NAS clients by publishing named attributes on a directory. A named attribute for each partial referral specifies a regular expression for the names of a set of files within the reference directory that the partial referral applies and one of the following formats for the actual referral:
a. The relative path where an alternate directory may be accessed. This path is relative to the root directory within the VM Private Directory that is reserved for use by the VM Storage Proxy. This format is preferable when the number of file system locations that would have to be encoded in the named attributes would be at risk of exceeding the space available for named attributes in some NAS clients.
b. The same information as provided for a regular referral, but encoded in named attribute format as file-location. When this format is used, the token file used to control access to this portion of the directory must be explicitly named.
c. A special notation indicating that the default Federated FS location for this directory should be used.

Figure 5:
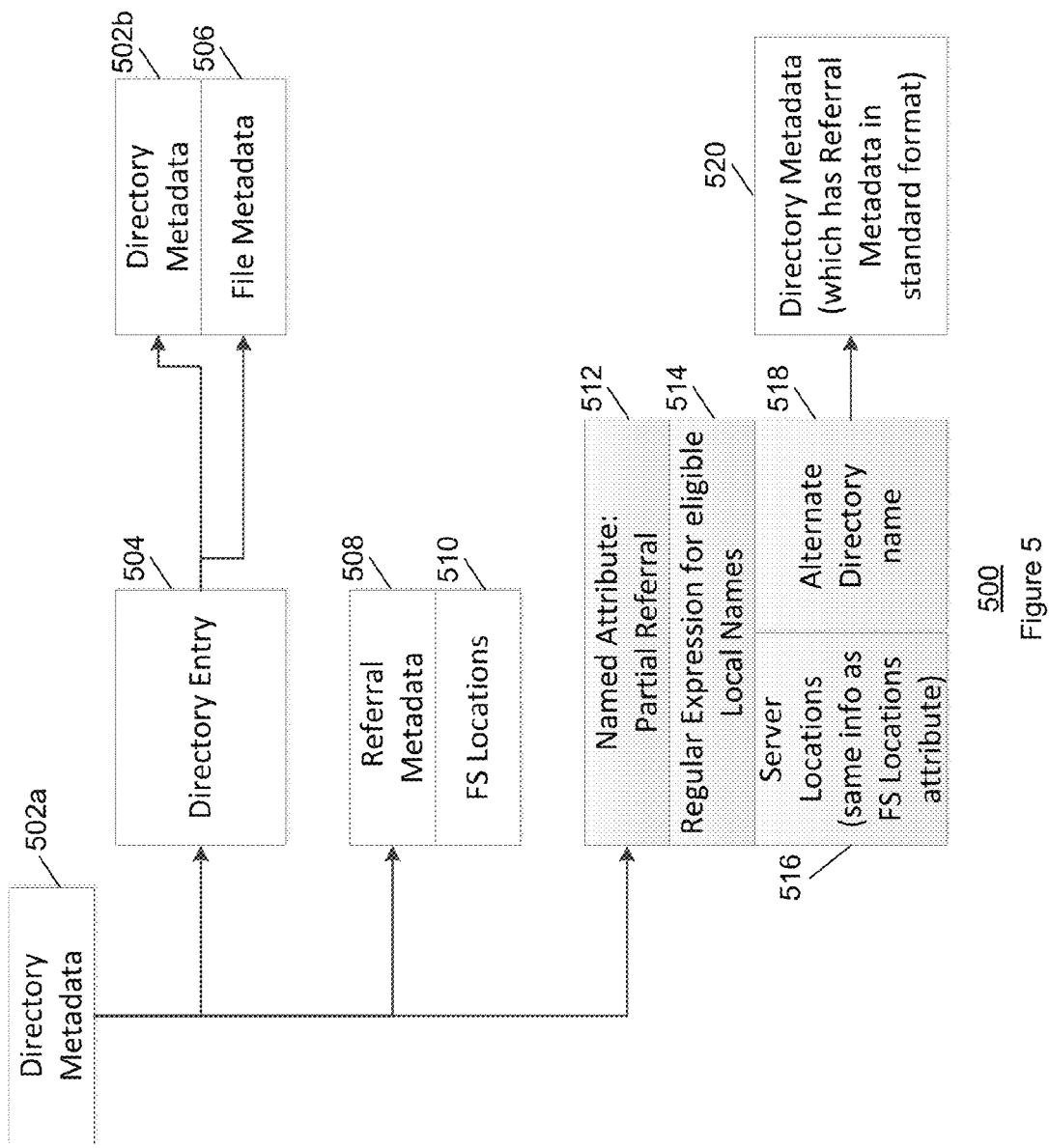
FIG. 5 illustrates the structure of directory metadata supporting partial referrals.

FIG. 5 illustrates the structure of directory metadata supporting partial referrals. The metadata 502a for any directory already includes zero or more Directory Entries 504 (which ultimately link to metadata for either a sub-directory 502b or a simple file 506), the standard referral entries including file system locations and named attributes. Specific attribute names indicate partial referrals 512.

This collaboration requires the support of the Headnode and all VM Storage Proxies involved.
a. The Headnode or VM Storage Proxy that provides service for the directory must support access for all files within the directory even if partial referral 512 references them to another server. Clients that have not accessed the metadata, or which might not understand it, will still reference files at the primary location for the directory. These requests may be handled as a traditional proxy.
b. Each Headnode or VM Storage Proxy assigned a partial directory must not perform any operation that creates a name that is not part of the slice assigned to it.
c. The requirements for ending usage of a specific proxy for any set of files within a directory are the same as for the directory as a whole. The proxy cannot cease supporting the files assigned to it until all updates for those files have been acknowledged by the Federated FS.
d. The named attributes controlling partial referrals 512 within a directory may only be updated by the file server that controls the directory.

A NAS Client that understands this metadata will merge the multiple partial directories into a single directory as presented to its users. These are well-known systems that are already used to merge file systems stored on read-only media, such as DVDs, with files updated on local storage.

Figure 6:
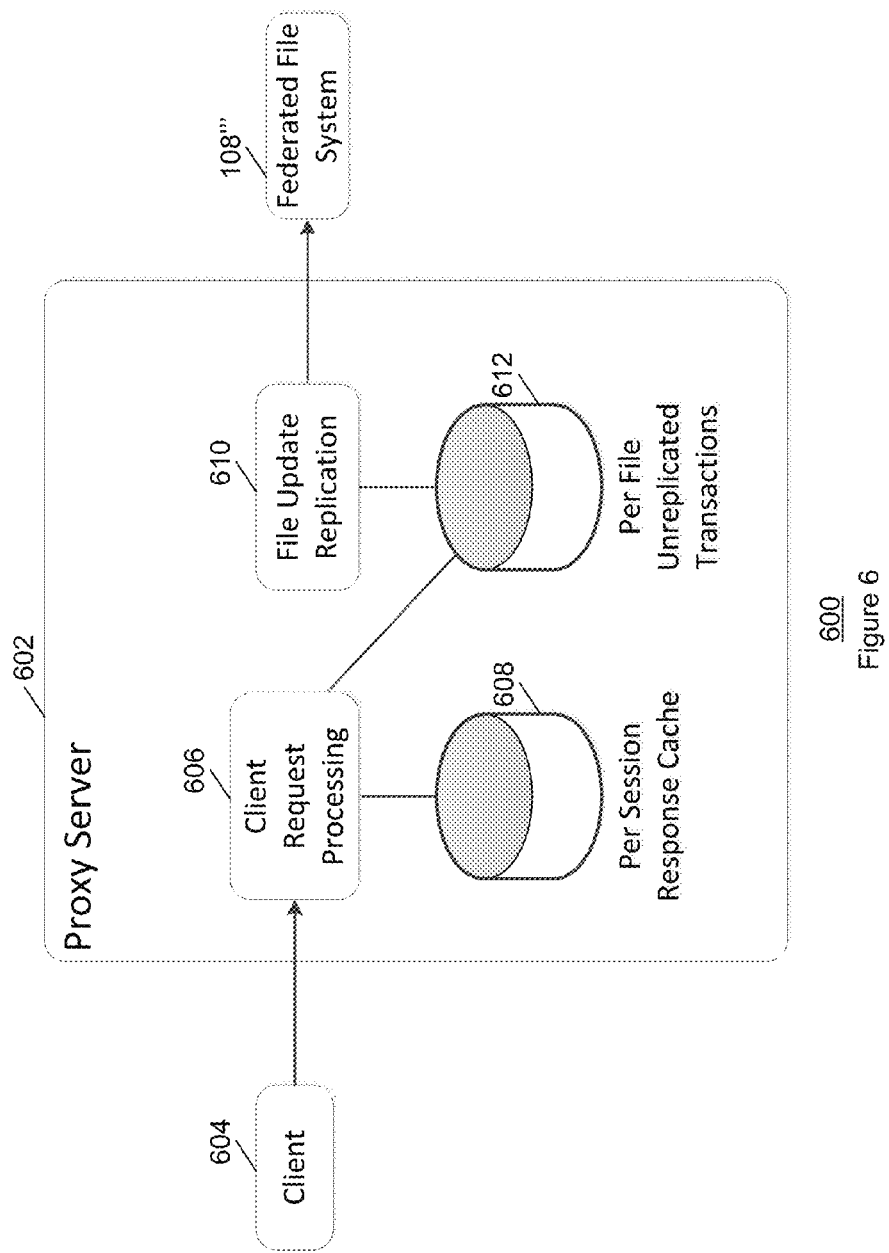
FIG. 6 illustrates the critical data that a NAS proxy must maintain related to directories that it is providing proxy access for and the NAS sessions it must maintain for its clients.

FIG. 6 illustrates the critical data 600 that a NAS proxy 602 must maintain related to directories that it is providing proxy access for and the NAS sessions it must maintain for its clients.

Selective File Caching

When NAS referrals are made by an enhanced Federated FS server 108'''' utilizing a system and method in accordance with the present invention, the referrals specific to the scope of NAS clients serviced by a VM Storage Proxy 222 of FIG. 2, the VM Storage Proxy 222 is enabled to continue to act as a NAS client within any VM Private Directory referred to it. The Federated FS 108' does not care whether the VM Storage Proxy 222 is replaying transactions it already completed or merely forwarding operations on uncached files.

Therefore, the VM Storage Proxy 222 may choose to only provide local storage for a subset of the files within a directory.

Whenever all updates for a file have been acknowledged by the Federated FS the proxy file server may cease local caching of a file.

Figure 7:
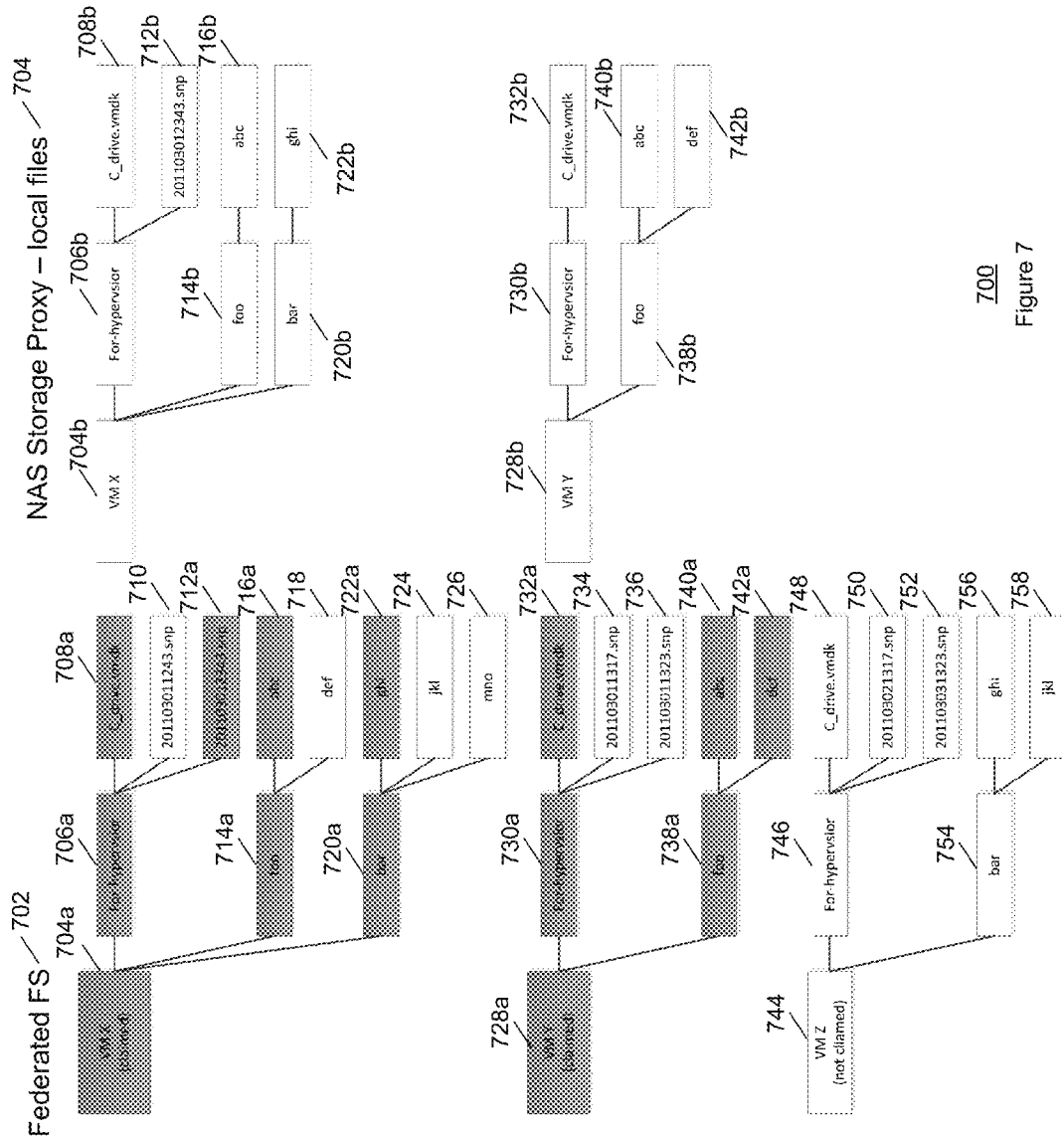
FIG. 7 illustrates the combined use of Selective Directory Referral and Selective File Caching.

FIG. 7 illustrates the combined effects 700 of Selective Directory Referral with Selective File Caching. In the diagram three VM private directories 704a, 728a, 744 are shown. Two directories have been assigned to a NAS Storage Proxy that is shown (X 704a and Y 728a), while Z 744 has not been claimed by a NAS Storage Proxy. In this example the VM Storage Proxy has claimed referrals for VM X 704a on the hypervisor 706a, foo 714a and bar 720a directories. It has de-referred hypervisor/201103011243.snp, foo/def 718, bar/jkl 724 and bar/mno 726. It has also claimed referrals for VM Y 728a on hypervisor 730a and foo 738a, and de-referred hypervisor/*.snp.

Selective Block Caching

Selective Block Caching is a technique that may be employed by the VM Storage Proxy. Under selective block caching, the proxy controls which portions of the blocks comprising a file are provided by local storage. Blocks not cached locally are accessed on a read-only basis from the Federated FS. The VM it selects which blocks to access locally so as to optimize the latency of performing updates and/or reads while limiting local storage to those blocks most likely to be accessed.

When Selective Block Caching is implemented the VM Storage Proxy includes the functionality of a Data Server to provide a Block Service API to the VM Storage Proxy. The Data Server resolves block references to either local storage or by accessing the Federated FS. It can also provide pNFS layouts referencing both local blocks and Federated FS blocks to pNFS VM clients. The Data Server is assigned ownership of local volumes. This local storage is used to hold portions of the referred/delegated files that will be partially migrated from their default network locations.

To implement this strategy the VM Storage Proxy maintains the following status, for each file it caches:

1) The local location of this file section, if any.
2) The network locations of this file section, if any. One of ordinary skill in the art will be aware that there will almost always be a network file location. The only exception is when the VM Storage Proxy has just updated a file and those updates have not yet been replicated to the Federated FS.

The VM Storage Proxy tracks the status of the Federated FS to determine when the Federated FS has adequate copies of an updated file. Only after an update has been adequately replicated will the VM Storage Proxy release the local storage by returning the blocks to a free pool and setting the local location to null.

Figure 8:
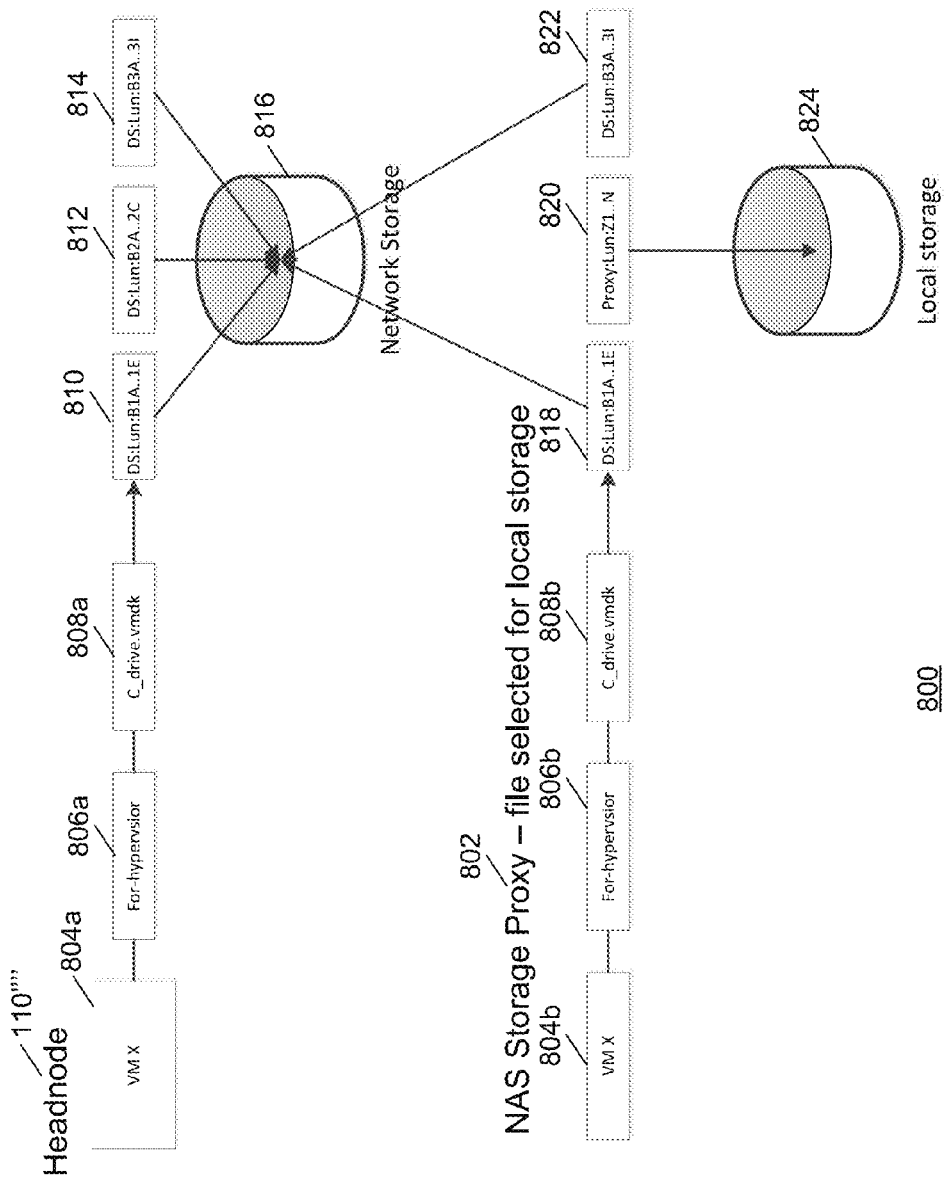
FIG. 8 illustrates how a VM Storage Proxy can construct a pNFS layout that references blocks as obtained from the network file server combined with selective blocks that are stored locally.

FIG. 8 illustrates how a VM Storage Proxy can construct a pNFS layout that references blocks as obtained from the network file server combined with selective blocks that are stored locally. The VM Storage Proxy has obtained a pNFS layout, or list of blocks, from the Federated FS. This is partially pre-empted for those blocks that are being cached locally.

Transparent Migration of a VM

A key feature of an embodiment in accordance with the present invention is Transparent Migration maintains the apparent identity of the VM Storage Proxy as perceived by the NAS clients. While the L4 connections will be reset, the NAS sessions with the VM Storage Proxy can be maintained.

Transparent Migration is implemented by the following steps:

a. Having constant L2 and L3 addresses for all VM Storage Proxies on each Internal Network rather than migrating the existing L4 connections held by the prior VM Storage Proxy to the new VM Storage Proxy.
b. Relying on standard network stack behavior to reset all L4 connections between the migrated NAS client and the constant L3 address.
c. Relying on the session features of NAS protocols to have the NAS client reconnect to the constant L3 address and retry unacknowledged transactions.
d. Storing the Response Cache that supports NAS sessions within the VM Private Directory Set. By successfully relinquishing exclusive control over a VM Private Directory Set the prior VM Storage Proxy will have already guaranteed that the new VM Storage Proxy will receive a complete Response Cache to enable it to continue NAS sessions transparently.

If the new VM Storage Proxy has not elected to store the referenced directory it will refer/redirect the client to the federated file system. From the perspective of the client, these actions are totally consistent with a local file server that has rebooted.

Non-Transparent Migration

Clients may also be migrated in a fashion that is non-transparent to the NAS client, but which allows the NAS client to provide transparent service to its users. The NAS client receives an explicit NAS referral to the new location for the referenced directory. The VM Storage Proxy previously assigned must issue this referral before ending the session with a migrated NAS Client. From the perspective of the NAS client, this is totally consistent with the directory having been migrated within the Federated File System.

The per-session Response Caches are not relevant for non-transparent migration because the NAS client will first terminate the current session and then create a new session with the newly referred location.

When a VM is to be migrated from a Hypervisor Host that has a VM Storage Proxy on the Internal Network to a Host that does not have an Internal Network it is necessary to first instruct the current VM Storage Proxy to return control of all directories for the VM to the Federated File System. This step is necessary because the NAS clients associated with the migrating VM will not be able to access the existing VM Storage Proxy on its Internal Network.

Figure 9:
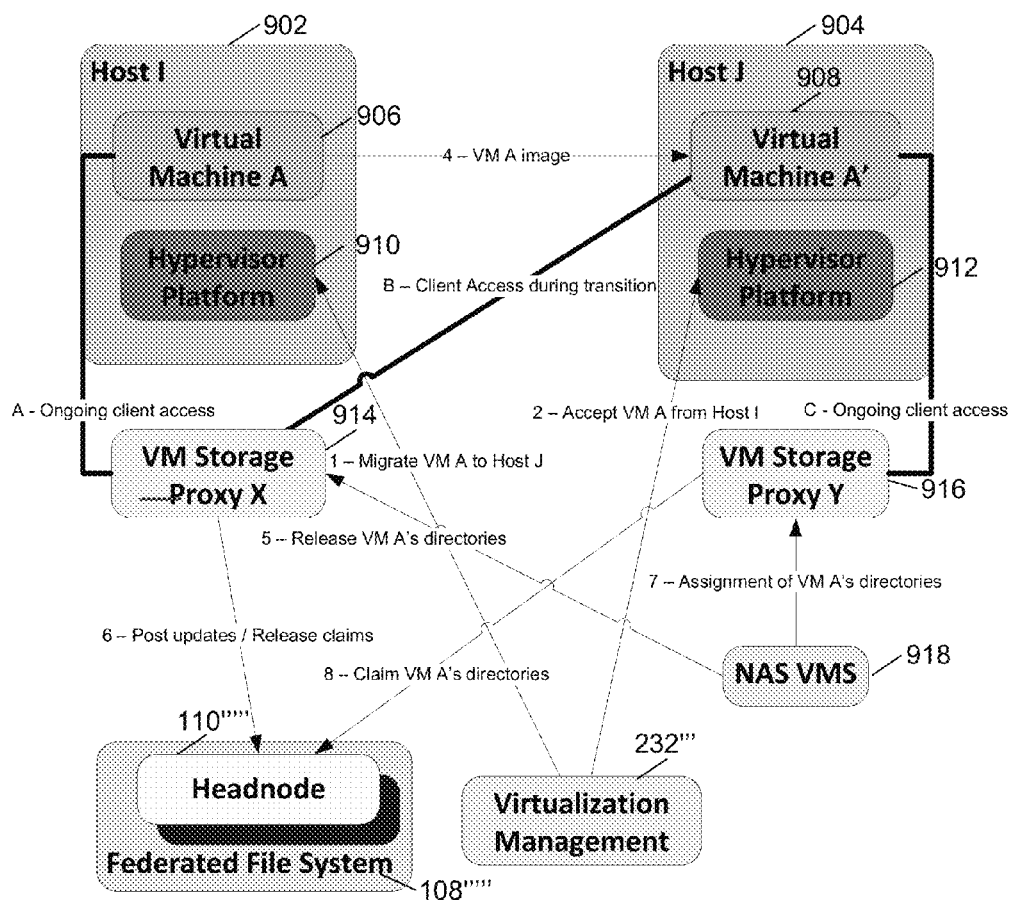
FIG. 9 illustrates the steps involved in a non-transparent migration.

FIG. 9 illustrates the steps involved in a non-transparent migration 900.

a. Virtualization Management 232'''' informs Hypervisor Platform I 910 to migrate VM A to Host J 904.
b. Virtualization Management 232''' informs Hypervisor Platform J 912 to accept VM A from Host I 902.

c. Virtualization Management 232''' informs NAS VMS 918 that VM A is being migrated from Host I 902 to Host J 904.
d. Hypervisor Platform I 910 will begin the transfer VM A to Hypervisor Platform J 912.
e. NAS VMS 918 will instruct the current VM Storage Proxy 914 for VM A to release its claims on A.
f. VM Storage Proxy X 914 will post all unacknowledged updates for VM A and release all claims on VM A directories.
g. NAS VMS 918 will instruct VM Storage Proxy Y 916 of the set of VM A's directories that are being assigned to it.
h. VM Storage Proxy X 914 will claim the assigned directories.

This results in three phases for NAS client access:
a. NAS clients access referred directories on VM Storage Proxy X 914 from Host I 902.
b. NAS clients continue to access VM Storage Proxy X 914 even after having started to execute on Host J 904. This is inefficient, therefore VM Storage X 914 will refer the clients to VM Storage Y 916 or the Headnode 110'''' after each directory is checked in.
c. NAS clients will now access referred directories on VM Storage Proxy Y 916 from Host J 902.

Figure 10:
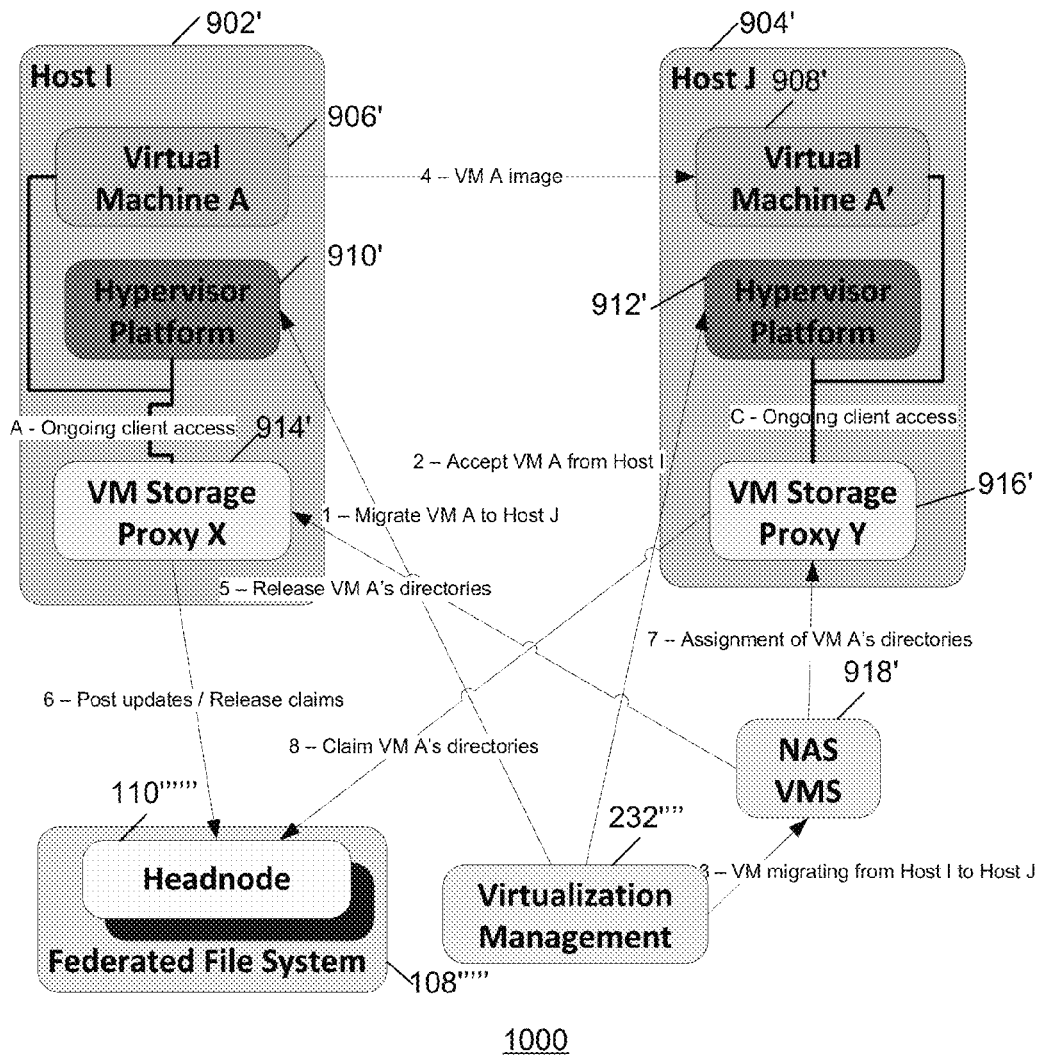
FIG. 10 illustrates another embodiment, wherein the same steps are involved in a transparent migration, while not requiring the transitional stage where the old VM Storage Proxy is referenced from NAS clients running on the new Host.

FIG. 10 illustrates another embodiment 1000, wherein the same steps are involved in a transparent migration, while not requiring the transitional stage where the old VM Storage Proxy is referenced from NAS clients running on the new Host.

Managing Local Storage

Before exhausting local storage resources the VM Storage Proxy will seek to return responsibility for some of that storage to the Federated FS 108''''''. There are multiple algorithms for selecting which files or blocks to return that are well known to those of ordinary skill in the art. Before yielding a directory or a file to the Federated FS 108'''''' the VM Storage Proxies 914' and 916' must complete all of its updates for the file/directory as a NAS client.

When a control plane exclusive claim was used to obtain the referral, the directory is released by releasing that claim. With an NFSv4.1 exclusive claim of a directory the requirement to post all updates before releasing the claim is already a requirement of the NAS protocol.

The VM Storage Proxies 914' and 916' are fully aware of the file boundaries within the private mount points, and can optimize caching and local storage decisions in a file-aware manner. This includes knowing what blocks comprise a given file, which blocks on a volume are actually in use, knowing the type of a file, and knowing the options used to open each file handle. Techniques for identifying duplicate sets of blocks and/or files are well-known prior art, and it is clearly easier to identify duplicate files when the file operations are visible to the optimizing layer.

Configuration of Host Environments

The VM Storage Proxies 914' and 916' may be configured with a port to provide local access over the Internal Network with a fixed IP and MAC address.

The Hypervisor Platform software switch and any other switch implementing an Internal Network connecting the VM clients and the VM Storage Proxy 914' and 916' must be configured so that:
1) No frame from an outside source will be allowed to reach the VM Storage Proxy's 914' and 916' Internal Network port using the designated local L3 or L2 Address. The simplest method of achieving this is to allow no outside source to place traffic on the Internal Network.
2) No other VM on this host will be able to use either the L3 or L2 address reserved for the VM Storage Proxy 914' and 916'. Typically, the Hypervisor Platforms 910' and 912' will already configure the switches under its control so as to prevent any VM 906 or 908 from using any source address other than those specifically assigned to it. Therefore this requirement is a subset of existing best practices.

In an embodiment for IP/Ethernet networks, ARP and/or IPv6 Neighborhood Discovery responses are also monitored and controlled to prevent or at least detect any attempt to claim the IP address for a MAC address that was not assigned to the VM Storage Proxies 914' and 916'. There are well known conventional techniques to ensure that the L3 address advertised for each L2 address conforms to pre-configured restrictions.

Each VM that will require support for accessing private mount points over an Internal Network must be assigned at least one L3 address on the Internal Network and must be able to generate traffic using that L3 address that reaches the Internal Network without requiring support of any external L3 router.

Usage Examples

Migration of a Virtual Machine

There are two distinct scenarios that must be consider when migrating the VM Storage Proxies 914' and 916' support for a VM:
a. Both VM Storage Proxies 914' and 916' are accessed over an Internal Network, and hence the migration is transparent to the VM.
b. One or both of the VM Storage Proxies 914' and 916' are accessed over the public network, therefore the NAS migration is done as a distinct step only after the migration of the VM has completed.

A NAS migration requires the following steps:
1. The NAS VMS must determine whether the VM Storage Proxy 914' or 916' supporting the VM needs to be changed based upon the new location.
   a. Even if it is the same VM Storage Proxies 914' and 916', then the Federated FS 108'''''' must be told that a new Hypervisor Platform 910' and 912' now controls the VM Private Directory. Once the Federated FS 108'''''' knows that the Hypervisor Platforms 910' and 912' is associated with a VM, that Hypervisor Platforms 910' and 912' becomes an approved client for the directories within the VM Private Directory Set designated for the Hypervisor Platforms 910' and 912'.
2. In the typical case where Hypervisor Platforms X 910' and Y 912' do not share a VM Storage Proxies 914' and 916' the NAS VMS 918' must see to the migration of control from the VM Storage Proxy (I) 914' associated with Hypervisor Platform X 910' to the VM Storage Proxy (J) 916' associated with Hypervisor Platform Y 912'.
   a. A reliable message must be sent over the Public Network to VM Storage Proxy I 914' telling it to yield control over all directories within the VM Private Directory for the VM in question.
   b. A reliable message must be sent over the Public Network to VM Storage Proxy J 916' telling it to assume control over the VM private directory in question.

3. VM Storage Proxy I 914' will cease acting as proxy server for directories in the VM's private directory.
   a. All updates not yet forwarded to the Federated FS 108""' must first be completed. This process is similar to how the VM's memory image itself is migrated. As updates are posted more updates may be processed, which will add to the queue.
   b. Once all updates for any directory within the VM private directory have been acknowledged by the federated file system 108""', VM Storage Proxy I 914' will release its exclusive claim on the specific directories.
   c. Once all directories within the VM Private Directory set have been unclaimed, VM Storage Proxy I 914' will release its exclusive claim on the right to control the VM Private Directory.
4. VM Storage Proxy J 916' will seek an exclusive claim on the right to control the VM Private Directory. There are several methods to sequence this after the release by VM Storage Proxy 916' that are compatible with the present invention. The only requirement is that the exclusive claim by VM Storage Proxy J 916' cannot succeed until VM Storage Proxy I 914' has released its exclusive claim.
5. VM Storage Proxy J 916' will determine the set of directories within the VM Private Directory Set that it will seek control over. Acting as a NAS client it will begin fetching the metadata for each of those sub-directories.
   a. During this period any packet received on the Internal Network from the L3 address of the VM will be dropped. This will be understood by the VM's NAS Client as being consistent with the network file server rebooting.
6. As the metadata fetch for any given directory is complete, VM Storage Proxy J 916' will exclusively claim that directory
7. When the VM attempts to continue use of an L4 connection established on the prior Internal Network, VM Storage Proxy J 916' will respond by resetting the L4 connection. This is consistent with the behavior of a network file server that has rebooted.
8. When a Client makes a request to access a directory that VM Storage Proxy J 916' has not taken control of then a Referral or Redirection back to the Federated FS 108""' must be issued.
9. When a Client makes a request to modify a file that has been referred to another file server using Partial Referrals the VM Storage Proxy must perform that operation as a NAS proxy.

A system and method in accordance with the present invention introduces a specialized class of NAS proxy, which it labels as a "VM Storage Proxy", specifically tailored to optimized large virtual deployments. This specialized server is never intended to become the new home of the files within the namespace; it can be used as a reliable cache that optimizes access for the intended clients. In the target environment it would be desirable to drop local storage for files or portions of files that have been replicated to the network file system at will, in order to optimize the utilization of limited local storage resources. This enables deployment profiles where the VM Storage Proxy may only have limited, but high performance, storage resources such as Solid State Disks (SSDs).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system comprising:
   Federated File System (Federated FS), wherein the Federated FS supports both a uniform namespace implemented by multiple servers and enables migration of files and directories from one server to another, the Federated FS comprising one or more network attached storage (NAS) file servers that stores file oriented directory sets that are exclusive to one or more virtual machines (VMs), wherein the file oriented directory sets include files that are to be accessed by the VMs;
   at least one NAS server providing storage services to a selected one or more VMs and Hypervisor Platforms hosting those VMs;
   NAS Virtualization Management system (NAS VMS), which interfaces with a Virtualization Management system; wherein the NAS VMS is responsible for dynamically assigning responsibility for supporting file access for the VMs to VM Storage Proxies; and
   one or ore NAS clients associated with the VMs and enhanced to understand extended semantics for controlling NAS referrals.

2. The system of claim 1, wherein at least one of the VM Storage Proxies provides specialized services to one or more virtual machines and the Hypervisor Platforms supporting the one or more VMs.

3. The system of claim 2 which includes scalable storage of files and directories associated with VMs, wherein the required control over NAS referrals and local storage caching may be exercised by the VM Storage Proxy itself and/or the NAS VMS.

4. The system of claim 3, wherein a specialized NAS proxy server is designated as a VM Storage Proxy.

5. The system of claim 4, wherein the VM Storage Proxy exercises control over a VM Private Directory Set.

6. The system of claim 4, wherein the referral/redirection references a VM Storage Proxy L3 address on an Internal Network accessible only by the Hypervisor Platforms the VM Storage Proxy is supporting, and the VMs running on those Hypervisor Platforms.

7. The system of claim 4, wherein VM Storage Proxy collaborates with Virtualization Management to optimize load balancing decisions when assigning VMs to hosts.

8. The system of claim 5, wherein a VM Private Directory Set includes directories within the global namespace of the Federated FS associated exclusively with a specific VM.

9. The system of claim 5, wherein the VM Storage Proxy obtains exclusive control over a VM Private Directory Set prior to starting to exercise control of referrals of the directories within it.

10. The system of claim 5, which includes optimizing access to the directories of the VM Private Directory Set with respect to the corresponding NAS Client, which may be one of the following: a) the Hypervisor Platform, b) VM Storage Proxy itself, or c) the VM itself.

11. The system of claim 9, wherein the VM Storage Proxy and Federated FS servers collaborate to refer a directory within a VM Private Directory Set via a NAS exclusive delegation or an exclusive opportunistic lock (oplock).

12. The system of claim 9, wherein the VM Storage Proxy and Federated FS collaborate to refer a portion of a directory rather than the directory as a whole.

13. The system of claim 9, wherein the VM Storage Proxy does not respond to any packet received on the Internal Network from any VM's L3 address until the transfer of control for that VM's private directory to the VM Storage Proxy is complete.

14. The system of claim 7, wherein the VM Storage Proxy receives notifications of VM migrations, launches and shutdowns from Virtualization Management System (NAS VMS).

15. The system of claim 11, wherein release of the claim on a directory by the VM Storage Proxy results in the referral or redirection of that directory being reverted to its normal setting.

16. The system of claim 11, wherein a Federated FS server supporting automatic referral allows direct access to referred directories from: (a) the VM Storage Proxy itself; (b) VMs or other VM Storage Proxies enabled by Partial Referrals; (c) management-plane readers granted read-only access in a manner that does not disrupt the other clients.

17. The system of claim 16, wherein Federated FS servers supporting automatic referral issue referrals/redirects for a claimed directory only to the authorized VM and Hypervisor Platform, and refuse access to any other client.

18. The system of claim 11, wherein the referral/redirection references VM Storage Proxy L3 address on the Public Network dynamically assigned by the NAS VMS utilizing notifications of VMs assigned to each Hypervisor Platform and profile information on each VM obtained from the Virtualization Management system.

19. The system of claim 11, wherein the VM Storage Proxy performs Selective Block Caching, with only portions of the blocks comprising a file stored locally.

20. The system of claim 9, wherein the VM Storage Proxy relies upon the source address of packets it receives on its Internal Network to reliably identify the NAS clients.

21. The system of claim 11, wherein the VM Storage Proxy relays operations on uncached files to the Federated FS, subject to access validation by the VM Storage Proxy.

22. The system of claim 11, wherein the VM Storage Proxy provides partial referrals to NAS clients, by publishing sets of Partial Referral named attributes, each specifying subset of files from a given partially referred directory.

23. The system of claim 21, wherein the VM Storage Proxy tracks the locations of sections of files within the Federated FS even when having those files or portions of those files cached locally.

24. The system of claim 11, wherein the VM Storage Proxy supports NAS clients that do not understand a Partial Referral named attributes.

* * * * *